(12) United States Patent
Lugert et al.

(10) Patent No.: US 8,732,959 B2
(45) Date of Patent: May 27, 2014

(54) MOTOR-DRIVEN HANDHELD CUTTING DEVICE, METHOD FOR PRODUCING SAME, AND DOUBLE BLADE ARRANGEMENT

(75) Inventors: Martin Lugert, Günzburg (DE); Ottmar Locher, Ulm-Donaustetten (DE)

(73) Assignee: Husqvarna AB, Huskvarna (SE)

( * ) Notice: Subject to any disclaimer, the term of this patent is extended or adjusted under 35 U.S.C. 154(b) by 259 days.

(21) Appl. No.: 13/394,731

(22) PCT Filed: Aug. 31, 2010

(86) PCT No.: PCT/EP2010/062697
§ 371 (c)(1),
(2), (4) Date: Mar. 7, 2012

(87) PCT Pub. No.: WO2011/036036
PCT Pub. Date: Mar. 31, 2011

(65) Prior Publication Data
US 2012/0167394 A1    Jul. 5, 2012

(30) Foreign Application Priority Data
Sep. 8, 2009 (DE) .......................... 10 2009 040 589

(51) Int. Cl.
*B26B 19/06* (2006.01)
(52) U.S. Cl.
USPC .................................. 30/216; 30/218; 30/228
(58) Field of Classification Search
USPC ........ 30/41.9, 216, 218, 228, 220, 205, 272.1
See application file for complete search history.

(56) References Cited

U.S. PATENT DOCUMENTS

| 3,959,878 | A | * | 6/1976 | Irelan et al. | 30/220 |
| 3,962,924 | A | * | 6/1976 | Glover et al. | 74/50 |
| 4,619,045 | A | * | 10/1986 | Mayer | 30/216 |
| 5,271,154 | A | * | 12/1993 | Ohkanda | 30/216 |
| 5,581,891 | A | * | 12/1996 | Wheeler et al. | 30/216 |
| 6,263,579 | B1 | * | 7/2001 | Nagashima | 30/220 |
| 6,263,979 | B1 | | 7/2001 | Dyke et al. | |
| 6,598,299 | B2 | * | 7/2003 | Stark et al. | 30/220 |
| 7,788,811 | B2 | * | 9/2010 | Hanada et al. | 30/216 |

(Continued)

FOREIGN PATENT DOCUMENTS

| DE | 3816363 | 11/1989 |
| DE | 4228598 | 10/1994 |

(Continued)

OTHER PUBLICATIONS

Register from German Patent Office listing references from German Search Report, printed May 24, 2012.

(Continued)

*Primary Examiner* — Sean Michalski
(74) *Attorney, Agent, or Firm* — Nelson Mullins Riley & Scarborough LLP

(57) ABSTRACT

The invention relates to a motor-driven cutting device with a double blade arrangement driven by means of a double eccentric arrangement having opposing oscillating blade movement, comprising an advantageous construction with a separate double eccentric group for the drive device that can form a uniformly operable front-part group, particularly in conjunction with the double blade arrangement at a particularly favorable cost, and that is advantageous for installing the front-part group in the production process and/or when replacing the preferably uniformly operable front-part group.

7 Claims, 3 Drawing Sheets

(56) References Cited

U.S. PATENT DOCUMENTS

| | | | |
|---|---|---|---|
| 8,028,423 B2* | 10/2011 | Matsuo et al. | 30/220 |
| 8,397,389 B2* | 3/2013 | Geromiller | 30/208 |
| 2002/0053140 A1* | 5/2002 | Stark et al. | 30/218 |
| 2008/0134521 A1* | 6/2008 | Hanada et al. | 30/173 |
| 2012/0167394 A1* | 7/2012 | Lugert et al. | 30/216 |

FOREIGN PATENT DOCUMENTS

| | | |
|---|---|---|
| DE | 19522971 | 2/1997 |
| EP | 1424002 | 6/2004 |
| JP | 9172866 | 7/1997 |
| JP | 2006238866 | 9/2006 |

OTHER PUBLICATIONS

International Search Report and Written Opinion of PCT/EP2010/062697.

Chapter II International Preliminary Report on Patentability of PCT/EP2010/062697.

Ryobi Operator's Manual for 26cc Hedge Trimmer, dated Jan. 16, 2008.

Ozito Cordless Hedge Trimmer & Grass Shear Operation Manual, CGH-180K.

* cited by examiner

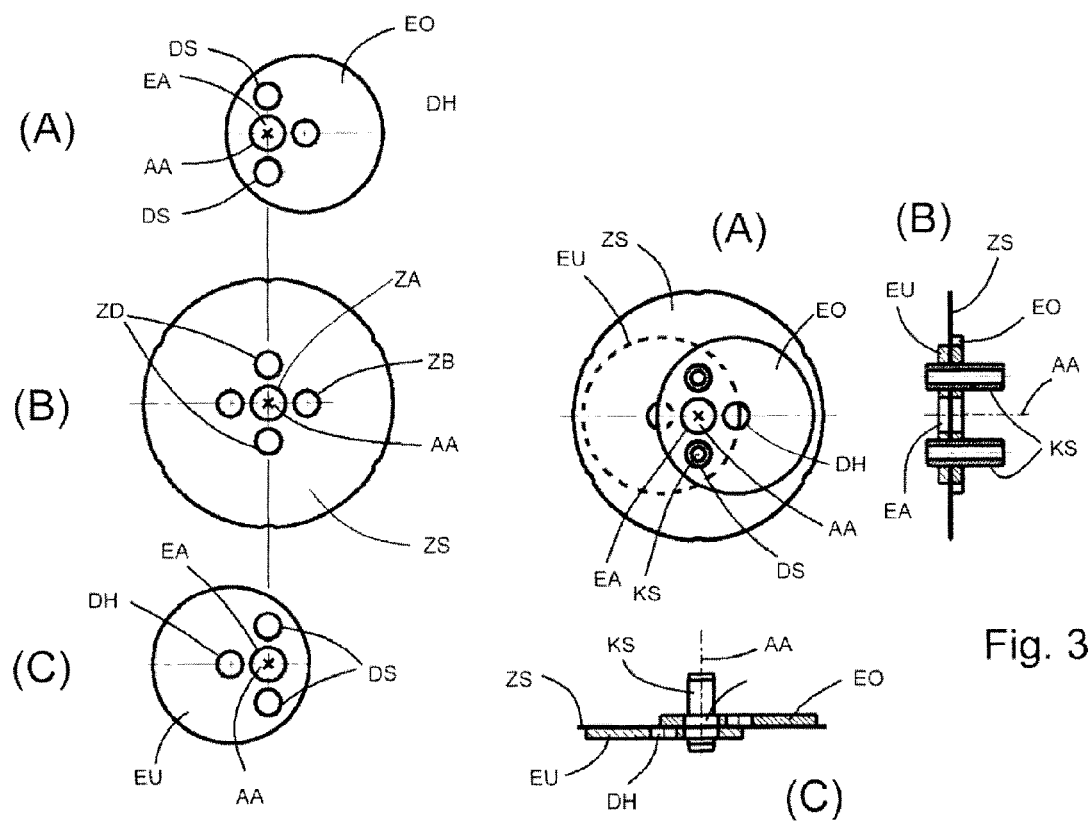
Fig. 2
Fig. 3
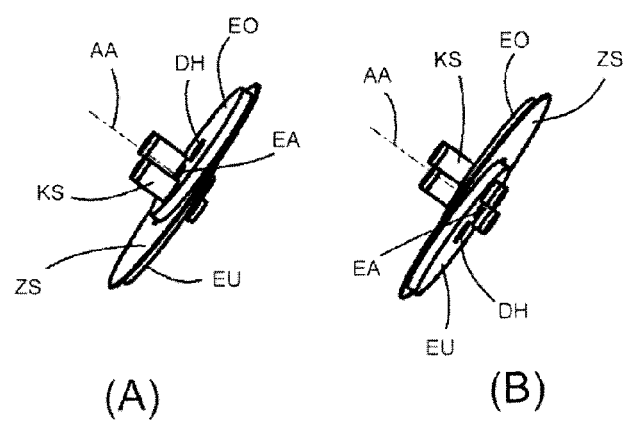
Fig. 4

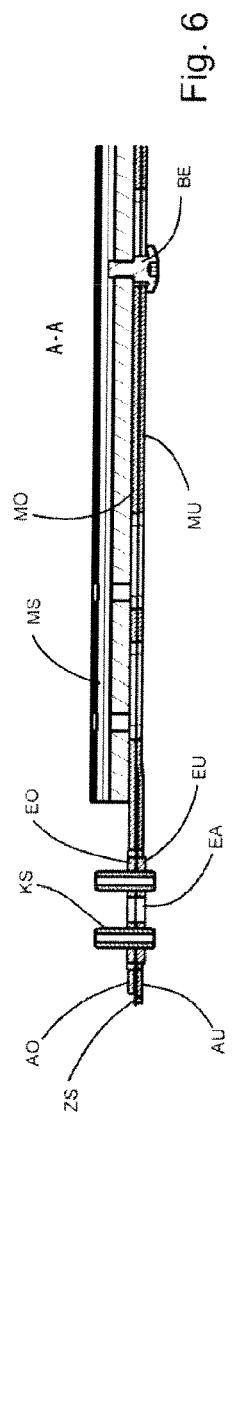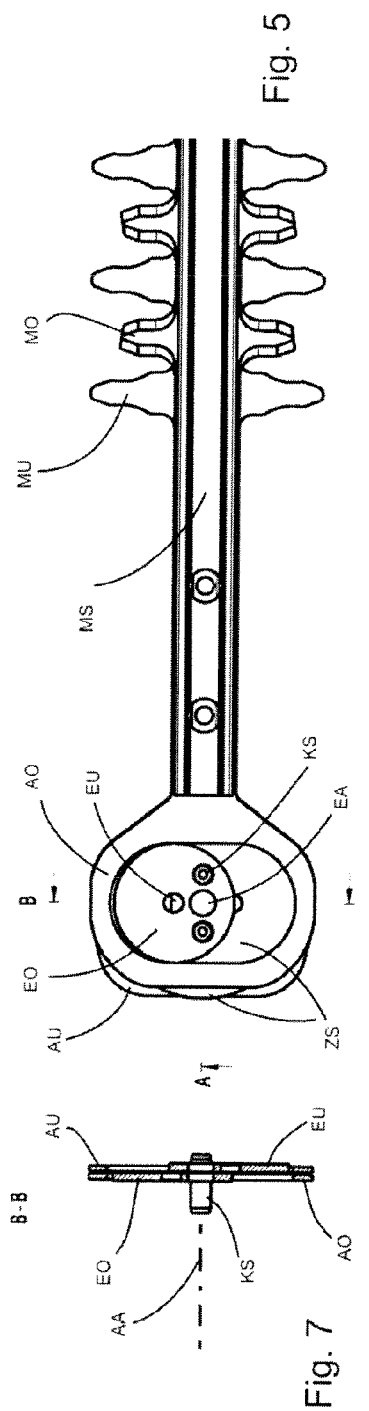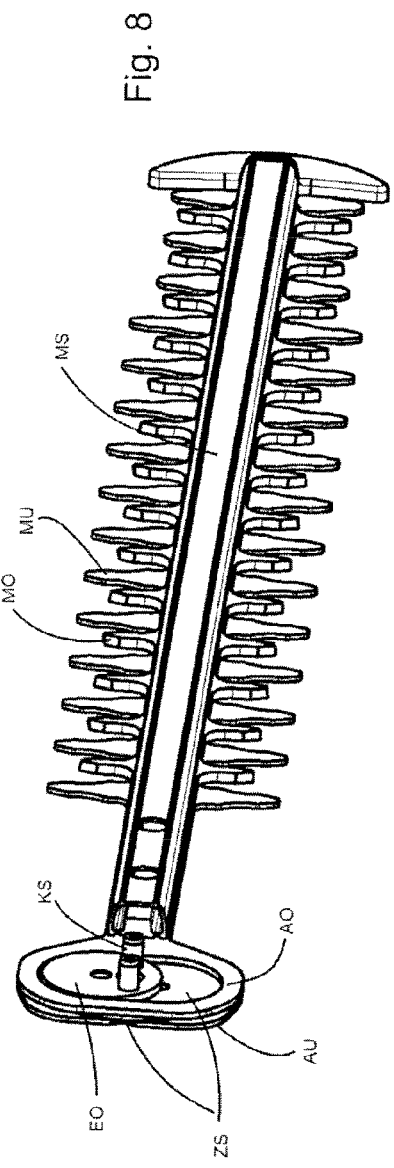

MOTOR-DRIVEN HANDHELD CUTTING DEVICE, METHOD FOR PRODUCING SAME, AND DOUBLE BLADE ARRANGEMENT

The invention relates to a motor-driven cutting device that is hand-guided in operation, in particular a hedge clipper, as well as to a method for its production and a double blade arrangement as replacement part for such a cutting device.

Motor-driven cutting devices with a cutting tool that are driven in an oscillating manner and hand-guided by the user in operation such as in particular hedge clippers, typically contain a double blade arrangement as cutting tool in which the two blades of the double blade arrangement are driven opposing one another in the sense of lesser vibrations and are driven in an oscillating manner relative to a device housing grasped by the user. As a rule, a rotary movement of a drive wheel about a driveshaft is converted for the drive via a double eccentric arrangement into two opposite, linearty oscillating movements of the two blades of the double blade arrangement.

DE 195 22 971 A1 describes a hedge clipper with a double eccentric drive arrangement in which the drive wheel is formed by two axially distanced wheel discs whose two wheel discs are provided with outer coggings and synchronously mesh via the latter with a common drive pinion. The wheel discs enclose the drive sections of the two blades, which sections slide on one another, and eccentric discs located in longitudinal holes of the drive sections axially between themselves. Each of the two eccentric discs is positively connected to one of the two wheel discs in a rotationally fixed manner. In another embodiment the two eccentric discs are positively coupled to one another in a rotationally fixed manner and are connected only frictionally to the wheel discs in order to form a slipping clutch, for which a plate spring arrangement is used. The wheel discs and the eccentric discs are set on a common shaft stub and rotated in common about the drive shaft during operation, which drive shaft is offset relative to the shaft of the motor-driven pinion. However, this drive arrangement is complex due to the many parts and unfavourable during the assembly or the replacement of the double blade arrangement. In particular, the slipping clutch requires a considerable assembly expense.

Drive arrangements in which the two eccentric discs are permanently fastened on a drive wheel are customary in such cutting devices. In the case of rather small drive outputs the drive sections are axially secured by a holding plate projecting on one side over the eccentric disc facing away from the drive wheel and permanently connected to the eccentric discs and to the drive wheel, and can be guided for assembly or disassembly over the holding plate under tilting. For rather large drive outputs a design is known in which the two eccentric discs are axially distanced by a distancing piece and, after the double blade arrangement has been axially set on the double eccentric arrangement, a slotted intermediate plate is inserted between the two drive sections of the double blade arrangement, which extends radially over the two eccentric discs and separates the two drive sections of the blades axially from one another. If the eccentric discs become worn the entire structural unit consisting of eccentric discs and drive wheel, into which a slipping clutch is advantageously integrated, must be replaced.

The present invention has the basic task of indicating a motor-driven cutting device with a double eccentric arrangement in the drive train that is economical and advantageous during the assembly in the production process and the disassembly and assembly during replacement of the cutting tool. Furthermore, an advantageous production method and an advantageous double blade arrangement for such a cutting device are indicated.

Solutions in accordance with the invention are described in the independent claims. The dependent claims contain advantageous embodiments and further developments of the invention.

The uniting of the two eccentric discs and an intermediate disc located relative to the drive shaft axially between the two eccentric discs to a permanently connected eccentric structural group that can be operated in a uniform manner but can be detached from the drive wheel yields surprisingly significant advantages.

The manufacture of the eccentric structural group is very simple. In particular, both eccentric discs and the intermediate disc can be manufactured as simple, level stamping parts in which all surface perforations for the mutual permanent connection and for the placing of the eccentric structural group on an axial bolt about the drive-shaft are preferably also already formed. Both eccentric discs can preferably have the identical form.

The connection of the two eccentric discs and of the intermediate disc located between the latter preferably takes place via at least two, preferably exactly two longitudinal, especially pin-shaped connection elements, which can also be understood to be casings, rod sections, bolts, rivets and the like. The connection elements are advantageously run through aligned recesses of both eccentric discs and of the intermediate disc. The longitudinal direction of the connection elements advantageously runs vertically to the plane of the eccentric discs and of the intermediate disc. The connection elements and the recesses in the eccentric discs are advantageously located in an overlapping area in which the two eccentric discs overlap in axial projection and are symmetrically arranged relative to the drive shaft covered by the overlapping area.

The connection elements are preferably pressed into the recesses of both eccentric discs. As a result of the simple construction of the eccentric structural group high joining forces for a great strength of the connection can advantageously be applied during the joining together of the eccentric structural group. During the pressing in of the connection elements into both eccentric discs the connection elements advantageously project axially over at least one of the eccentric discs, preferably over both eccentric discs. Sections of the connection elements which sections project axially beyond the eccentric disc facing the drive wheel can advantageously form cam structures at the same time for a rotationally fixed coupling of the eccentric structural group to the drive wheel, which engage in the mounted state of the device into corresponding structures, in particular axially parallel bores, of the drive wheel.

The intermediate disc advantageously projects over both eccentric discs in radial direction and lies axially between the flat drive sections of the blades of the double blade arrangement so that the two measuring planes in the drive area and the eccentric discs located in these measuring planes are reliably separated by the intermediate disc.

The drive wheel, which is axially arranged only on one side of the construction group, can comprise an outer cogging in a customary advantageous embodiment and can contain an integrated overload coupling. The drive wheel can be driven in a typical embodiment via a motor-driven pinion meshing in the outer cogging and with a pinion shaft radially offset relative to the driveshaft. In another known embodiment the drive can also take place via a planetary gearing in which the motor shaft and the driveshaft run aligned with one another.

In the manufacture of the cutting device the eccentric structural group is advantageously prefabricated by rigidly joining together the two eccentric discs and the intermediate disc separately from the drive wheel and subsequently joined together with the double blade arrangement onto the drive wheel, in particular by axial insertion. The eccentric structural group and the double blade arrangement can advantageously be connected as a uniformly operable front-part group, whereby the prefabricated eccentric structural group can be inserted preferably already during the joining together of the two blades of the double blade arrangement between the drive sections of the two blades or in another procedure even subsequently after the joining together of the two blades of the double blade arrangement under elastic deformation of the drive-side ends of the blades. The eccentric structural group is held in the correct position and undetachably in the drive sections of the double blade arrangement and the front-part group formed in this manner can be simply joined together with the drive wheel. In particular, the front-part group can also be readily drawn axially off from the drive wheel in order, for example, to use a new double blade arrangement as replacement part.

In a preferred embodiment a double blade arrangement as exchange part/replacement part already contains an eccentric structural group inserted between the drive sections of the blades and forms as a front-part group an operable sales unit that can be set into a device even without special tools by technically gifted users.

The invention is described in detail in the following using preferred exemplary embodiments with reference made to the illustrations, in which:

FIG. 2 shows individual parts of an eccentric structural group,

FIG. 3 shows an eccentric structural group in orthogonal views,

FIG. 4 shows the eccentric structural group according to FIG. 3 in two oblique views, FIG. 5 shows a section of a double blade arrangement in a top view, FIG. 6 shows the arrangement according to FIG. 5 in sectional lateral view, FIG. 7 shows another section through FIG. 5, FIG. 8 shows an oblique view of a front-part group.

Figure 1:
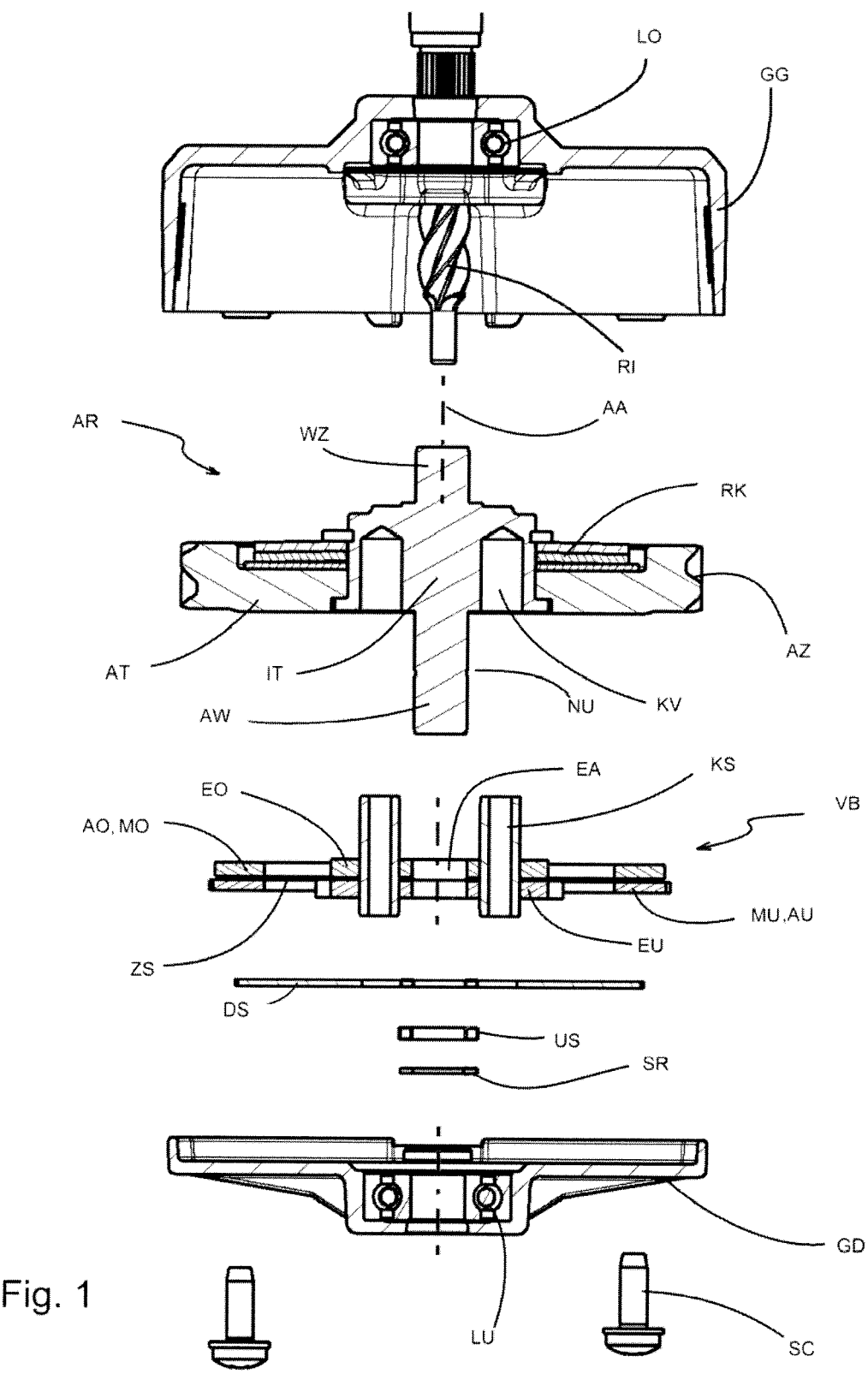
FIG. 1 shows components of a blade drive in assembled position.

FIG. 1 shows a grouping of components of a drive in a cutting device in accordance with the invention. A downwardly open, cup-shaped transmission housing has an upper support LO into which a pin WZ of a driveshaft of a drive wheel AR can be inserted. A motor-driven pinion RI with an oblique cogging is sketched in the transmission housing, which pinion rotates about a pinion shaft arranged offset to the rear relative to the drive axis AA of the drive wheel AR counter to the plane of the drawing and is preferably arranged on the motor shaft.

The drive wheel AR comprises an outer oblique cogging AZ and engages with this cogging into the pinion RI when the drive wheel is inserted into the transmission housing GG.

The drive wheel can advantageously comprise, as sketched, an annular outer part AT with the cogging AZ and an inner part IT around the drive axis AA, whereby the inner part and the outer part are connected to one another by an overload coupling RK. The integration of an overload coupling into such a drive wheel is known. For a reliable designing of the reaction torque of the overload coupling high axial joining forces and a precise method of operation are required so that the drive wheel can typically only be joined together by machine in the manufacturer and cannot be disassembled by the user himself or by a service location.

Recesses KV parallel to the drive axis AA and offset relative to it are formed in the inner part IT of the drive wheel. A shaft piece AW extends from the middle part IT downward facing away from the upper support LO. A groove NU is formed on the shaft piece and serves to receive a safety ring SR. An eccentric structural group that is separately explained in FIG. 2 to FIG. 4 and has an upper eccentric disc EO, a lower eccentric disc EU and an intermediate disc ZS inserted between these two eccentric discs has a central opening EA via which the eccentric structural group can be pushed onto the downwardly projecting shaft pin of the inner part of the drive wheel. Coupling pins KS project from the eccentric structural group in the direction of the drive wheel past the upper eccentric disc EQ. The coupling pins KS can be inserted in the direction that is axial relative to the drive axis AA into the recesses KV of the inner part of the drive wheel. The coupling pins K1 are permanently connected to the eccentric discs of the eccentric structural group and are preferably pressed into them.

In FIG. 1 the eccentric structural group is shown already connected to drive sections of a known double blade arrangement and assembled to a front-part group VB, whereby the double blade arrangement is represented by an upper blade MO and a lower blade MU and their drive sections AO, AW. The drive sections AO, AU of the two blades MO, MU of the double blade arrangement have oblong holes in which the circular eccentric discs rest. When the eccentric structural group is rotated about the drive axis the eccentric discs slide into the particular longitudinal hole recesses of the drive sections AO, AU of the upper blade MO and of the lower blade MU and bring about an opposing oscillating movement of the two blades. The manner of driving a double blade arrangement via a double eccentric arrangement is known and customary.

A cover disc DS can be placed from below onto the lower eccentric disc EU and onto the drive section of the lower blade MU. The eccentric structural group, the drive sections of the double blade arrangement and the cover disc are held under the interposing of a spacer US on the bottom of the drive wheel AR, whereby the safety ring engages into the groove NU of the shaft piece AW of the inner part IT of the drive wheel. A transmission cover GD is fastened from below with screws SC on the transmission housing or on the device housing on the drive device assembled in axial direction from the described components. The assembled drive device is securely supported via the upper support LO in the transmission housing GG and via the lower support LU in the transmission cover GD.

When the drive device is joined together the drive section of the upper blade MO is axially fixed between the intermediate disc and the side of the drive wheel AR facing the eccentric structural group. Another disc opposite the drive wheel is not provided. The drive section of the lower blade MU is axially fixed between the intermediate disc ZS and the cover disc DS.

The drive device can be broken down in a simple manner into the components shown in FIG. 1 in that the transmission cover GD is screwed off and drawn off and after the removal of the safety ring SR the washer, the cover disc and the eccentric structural group connected to the double blade arrangement are drawn off from the shaft pin of the drive wheel.

An essential component of the drive device of the apparatus is formed by the eccentric structural group, that is shown in detail in FIG. 2 to FIG. 4. The eccentric structural group contains a first eccentric disc EO and a second eccentric disc EU that can be advantageously designed to have the same construction. The upper eccentric disc EO shown in FIG. 2(A) and the lower eccentric disc EU shown in FIG. 2 (C) can advantageously be designed to have the same construction so that only a single structural part form is required for the eccentric discs. The eccentric discs can advantageously be manufactured as level stamping parts. In FIG. 2 the eccentric discs EO and EU are arranged in their assembled position relative to the intermediate disc ZS.

The axial discs have a shaft recess EA through which the shaft piece of the drive wheel projects in the assembled state. The recesses EA are located eccentrically to the centre of the circumferential circle of the eccentric discs. The substantially circular intermediate disc ZS again has a recess ZA in its middle for insertion onto the shaft piece of the drive wheel.

The eccentric discs EO, EU have two other surface openings DS that are preferably symmetrically opposite one another relative to a central plane ME running to the middle of the shaft recess AA. The intermediate disc ZS contains openings ZD at positions corresponding to the openings DS through the eccentric discs relative to the central recess ZA. The eccentric discs are placed over one another with interpositioning of the intermediate disc SZ in such a manner that the shaft recesses EA of the eccentric discs are in alignment with the central recess ZA of the intermediate disc and the recesses DS of the eccentric discs are in alignment with recesses ZD of the intermediate disc and the two eccentric discs are positioned rotated through 180° relative to one another. A pin-shaped element is run through the recesses DS and ZD and preferably pressed into the recesses DS. The pin-shaped elements can be pressed into the recesses DS in particular under radial tensioning in the manner of spring bushes. Other fastening possibilities are known to the person skilled in the art.

The two eccentric discs and the intermediate disc are permanently connected to one another and form a uniformly operable eccentric structural group by the pin-shaped elements run through the recesses DS of both eccentric discs and through the recesses ZD of the intermediate disc. The eccentric structural group has an especially simple construction and can be manufactured in a simple and economical manner. Additional surface recesses DH in the eccentric discs can advantageously serve to align the eccentric discs in a tool in which the two eccentric discs and the intermediate disc are connected via the rod-shaped elements. Additional surface openings ZB are present in the intermediate disc that can also serve for alignment in the tool.

In the finished eccentric structural group, that is shown in FIG. 3(A) in an axial view and in FIG. 3(B) and FIG. 3(C) in sectional lateral views B-B and C-C, the pin-shaped elements KS project over the surface of the upper eccentric disc EO facing axially away from the intermediate disc ZS. The length projecting over the eccentric disc EO is advantageously greater than twice the thickness of the eccentric disc. For a reliable and permanent connection of the two eccentric discs by pressed-in, pin-shaped elements KS the pin-shaped elements can also project over the lower eccentric disc EU on the axially opposite side.

It can be recognized in the axial view according to FIG. 3(A) that the two eccentric discs overlap in axial projection in a biconvexly lens-shaped area UB. The overlapping area UB includes in axial projection the axial recesses EA, that are aligned with one another, of the eccentric discs about the drive axis AA as well as includes the openings DS with the rod-shaped elements KS.

The eccentric structural group can be manufactured in an especially simple and economical manner separately from the other components of the drive device of the apparatus and can be managed in the further manufacturing process as a uniform structural part. The uniform ability to manage the eccentric structural group constructed in a simple and economical manner can also be advantageous for the replacement of an eccentric structural group. FIG. 4 shows the assembled eccentric structural group in two oblique views viewed obliquely from above in FIG. 4(A) and viewed obliquely from below in FIG. 4(B).

The eccentric structural group is advantageously connected during the manufacture of the device with a double blade arrangement to a uniformly operable unit as a front-part group in the manufacturing process, whereby the upper eccentric disc EO comes to rest in the oblong hole of the drive section of the upper blade and the lower eccentric disc EU comes to rest in the oblong hole of the drive section of the lower blade. The intermediate disc ZS, which projects radially over the two eccentric discs preferably in all directions about the drive axis then lies in the axial direction between the drive sections of the two blades of the double blade arrangement so that the eccentric structural group is held in a non-detachable manner in the drive sections of the double blade arrangement and can be operated uniformly with the double blade arrangement. This is represented in FIG. 1 in that the eccentric structural group is shown connected in the described position to the drive sections of the double blade arrangement.

The eccentric structural group can be inserted during the connecting of the two blades of the double blade arrangement to a blade structural group between the drive sections of the two blades. Given sufficient elastic deformability of the blades, as is typical in hedge clipper blade arrangements, the eccentric structural group can also be inserted subsequently between the drive sections of the two blades of an already assembled double blade arrangement in that the drive sections are bent away from each other under elastic deformation and the eccentric structural group is set in between them.

With such a front-part group, that can be manufactured in a simple and economical manner, even the further manufacturing process becomes especially simple and favourable in that the blade arrangement with the front-part group containing the eccentric structural group is set with the aligned recesses EA of the eccentric discs onto the shaft pin around the drive shaft, whereby the sections of the pin-shaped elements projecting over the upper eccentric disc EO engage into the recesses KV of the drive wheel and in this manner a permanent rotary coupling is established for transferring the drive torque from the motor to the blade arrangement. After the slipping on of the cover disc DS and of the spacer US and the attaching of the safety ring SR the upper eccentric disc EO lies close to the side of the drive wheel facing it and the pin-shaped elements KS are consequently substantially only loaded upon shearing without a tilting moment during operation of the device and thus form a reliable coupling even with the simple design of the pin-shaped elements. After the mounting of the lower support LU with the housing cover on the section of the shaft pin of the drive wheel, which section projects over the safety ring, and after screwing the cover down on the device housing or on the transmission housing GG, the assembly of the drive device is concluded.

In a corresponding manner, the disassembly is especially simple if service is needed with the screwing off of the housing cover GD, the removal of the safety ring and drawing the front-part group out of the double blade arrangement and the eccentric structural group.

The front-part group is also especially advantageously a replacement part that can be managed independently and which, after the removal of the unit containing the double blade arrangement and the eccentric structural group to be replaced, is mounted on the shaft pin in their place in a simple manner and secured with the cover disc, the washer and the safety ring.

FIG. 5 to FIG. 8 show such a front-part group that can, in particular, also be prepared as a replacement part and handled as such a unit in different views. FIG. 8 shows an oblique view of a double blade arrangement in which an upper blade MO and a lower blade MU are held on a common blade rail MS in a longitudinally shiftable manner. An eccentric structural group of the type described in FIG. 2 to FIG. 4 is inserted into the drive sections AO of the upper blade MO and AU of the lower blade MU in such a manner that the intermediate disc ZS lies flat between the two drive sections and each eccentric disc engages into a longitudinal hold of a drive section. The rod-shaped elements KS project as coupling elements upward past the upper eccentric disc EO. FIG. 5 shows a top view onto the further section of an arrangement according to FIG. 8. FIG. 6 shows a sectional lateral view along A-A of FIG. 5 and FIG. 7 shows a sectional view along the sectional plane designated in FIG. 5 with B-B.

The upper blade and the lower blade are fastened on the blade rail MS by fastening elements, distanced in the longitudinal direction of the blade arrangement from the drive sections. The distance of the drive sections from the closest-lying fastening element BE of the blades to the blade rail is as a rule sufficient so that the two blade plates can be elastically bent up so far apart from one another in the area of their drive sections that the eccentric structural group can be inserted between the drive sections. In the case of a uniformly operated front-part group consisting of a double blade arrangement and an eccentric structural group this can take place during the manufacture and an especially advantageous procedure results for the user or the service co-worker when replacing a blade arrangement.

The above features and the features indicated in the claims as well as the features that can be gathered from the illustrations can advantageously be realized individually as well as in different combinations. The invention is not limited to the exemplary embodiments described but rather can be modified in many ways in the framework of professional knowledge.

The invention claimed is:

1. A motor-driven cutting device, in particular a hedge clipper, with a double-eccentric arrangement that moves two blades in a contra-rotating manner relative to the drive axis and oscillating toward one another, whereby the external disks lie in oblong holes of the blades and are connected in a rotationally fixed manner to one another and to a drive wheel,
   wherein the two eccentric discs are constructed as separate structural parts and are permanently connected under the interpositioning of an intermediate disc to the latter to a uniformly operable eccentric structural group and are coupled to the drive wheel in a rotationally fixed manner relative to the drive axis and in an axially detachable manner via cam structures and counterstructures that engage into each other axially between the eccentric structural group and the drivewheel,
   wherein the eccentric discs overlap in an overlapping area enclosing the drive axis in projection in the direction of the drive axis, two pin-shaped connection elements are provided in the overlapping area radially distanced from the drive axis and aligned parallel with the latter which elements permanently connect the two eccentric discs and the intermediate disc to the eccentric structural group,
   wherein the pin-shaped connection elements are pressed into aligned surface openings in the eccentric discs and into recesses in the intermediate disc, and
   wherein the connection elements project axially past the eccentric discs in the direction of the drive wheel and form the cam structures, and whereby the cam structures detachably engage into the recesses of the drive wheel that form counterstructures.

2. The cutting device according to claim 1, wherein the intermediate disc projects radially over the eccentric discs and lies axially between the drive sections of the blades.

3. The cutting device according to claim 1, wherein the drive wheel has an outer cogging and meshes via the latter with a motor-driven pinion.

4. The cutting device according to claim 3 wherein the drive wheel comprises an integrated overload coupling between an annular outer part carrying the outer cogging and between an inner part comprising the counterstructures for the cam structures.

5. The cutting device according to claim 1, wherein the intermediate disc has a lesser thickness than the eccentric discs.

6. A method for producing a cutting tool comprising:
   permanently connecting two separate eccentric discs to one another to form an eccentric structural group with interpositioning of an intermediate disc, that connecting the eccentric structural group to a double blade arrangement in the manner of a front-part group, providing that the intermediate disc with sections projecting radially past the eccentric discs lies axially between the drive sections of the blades of the double blade arrangement, and providing that the front-part group is axially joined together with a drive wheel, whereby a rotationally fixed coupling is established between the eccentric structural group and the drive wheel,
   wherein the two eccentric discs of the eccentric structural group overlap in an overlapping area enclosing the drive axis in projection in the direction of the drive axis,
   wherein two pin-shaped connection elements are provided in the overlapping area radially distanced from the drive axis and aligned parallel with the latter which elements permanently connect the two eccentric discs and the intermediate disc to the eccentric structural group,
   wherein the pin-shaped connection elements are pressed into aligned surface openings in the eccentric discs and into recesses in the intermediate discs, and the connection elements project axially past the eccentric discs in the direction of the drive wheel and form the cam structures.

7. A double blade arrangement with two blades of a cutting device as exchange structural group, wherein the exchange structural group contains an eccentric structural group with two separate eccentric discs and an intermediate disc axially enclosed between the latter, whereby each one of the eccentric discs rests in an oblong hole of a drive section of one of the two blades, and the intermediate disc lies, with sections projecting radially beyond the eccentric discs relative to a drive axis, between the drive sections of the blades,
   wherein the two eccentric discs of the eccentric structural group overlap in an overlapping area enclosing the drive axis in projection in the direction of the drive axis,
   wherein two pin-shaped connection elements are provided in the overlapping area radially distanced from the drive axis and aligned parallel with the latter which elements permanently connect the two eccentric discs and the intermediate disc to the eccentric structural group, wherein the pin-shaped connection elements are pressed into aligned surface openings in the eccentric discs and into recesses in the intermediate disc, and the connection elements project axially past the eccentric discs in the direction of the drive wheel.

* * * * *